(12) United States Patent
Chen et al.

(10) Patent No.: US 9,400,358 B2
(45) Date of Patent: Jul. 26, 2016

(54) ALIGNMENT JIG FOR OPTICAL LENS ARRAY

(71) Applicant: TrueLight Corporation, Hsinchu (TW)

(72) Inventors: Po Hsiang Chen, Miaoli County (TW); Tsung-Kai Lin, New Taipei (TW); Yun Cheng Yu, New Taipei (TW)

(73) Assignee: Truelight Corporation, Hsinchu (TW)

( * ) Notice: Subject to any disclaimer, the term of this patent is extended or adjusted under 35 U.S.C. 154(b) by 0 days.

(21) Appl. No.: 14/667,452

(22) Filed: Mar. 24, 2015

(65) Prior Publication Data

US 2015/0323750 A1 Nov. 12, 2015

(51) Int. Cl.
*G02B 6/42* (2006.01)

(52) U.S. Cl.
CPC ............ *G02B 6/4231* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 5,926,594 A * | 7/1999 | Song | ......................... | G02B 6/30 385/15 |
| 5,940,562 A * | 8/1999 | Henson | ................ | G02B 6/3885 385/88 |
| 2002/0131699 A1* | 9/2002 | Raguin | .................. | G02B 6/322 385/33 |
| 2005/0018972 A1* | 1/2005 | Anderson | ............ | G02B 6/4249 385/53 |
| 2014/0301702 A1* | 10/2014 | Beausoleil | ............... | G02B 6/30 385/72 |

* cited by examiner

*Primary Examiner* — Hemang Sanghavi

(57) ABSTRACT

An alignment jig for an optical lens array is furnished on an optical alignment apparatus. The alignment machine is for performing active optical alignment operations of a sensor chip located on a circuit board and a lens socket plugged with a fiber plug. The alignment jig includes a support arm, a pick-up mechanism and a pushing mechanism. The support arm is fixed to the optical alignment apparatus for supporting the alignment jig. The pick-up mechanism is furnished on the support arm for picking-up and holding the lens socket in a detachable manner at a predetermined position corresponding to the sensor chip. The pushing mechanism holds the plugging status when the fiber plug is plugged into the lens socket and provides a pushing force, such that the fiber plug has a tendency to be pushed toward and engage the lens socket tightly.

9 Claims, 9 Drawing Sheets

ALIGNMENT JIG FOR OPTICAL LENS ARRAY

This application claims the benefit of Taiwan Patent Application Serial No. 103116720, filed May 12, 2014, the subject matter of which is incorporated herein by reference.

BACKGROUND OF INVENTION

1. Field of the Invention

The invention relates to an alignment jig for an optical lens array, and more particularly to the alignment jig that can push to tightly engage a fiber plug and a corresponding lens socket so as to conveniently perform active optical alignment operations on the alignment jig.

2. Description of the Prior Art

As the development of the chip-on-board (COB) manufacturing technology, constructions of the optical transceiver have been greatly affected. In the art, the conventional manufacturing process of the optical transceiver is firstly to prepare the laser sensor chip into a transistor-outline-CAN (TO-CAN) package, the TO-CAN package is then aligned optically with a lens member so as to form an optical sub-assembly (OSA), and finally a complete optical transceiver set is formed by mounting an emitting OSA and a receiving OSA to the respective optical transceivers on the circuit board. Recently, as the progress of the art in COB, the related manufacturing process and the structuring of the related product have been greatly simplified. Practically, a modem laser transceiver can be obtained by simply mounting the sensor chip onto the optical transceiver of the circuit board, processing necessary wire bonding, and finally performing optical alignment upon the related lens members.

The alignment jig in the art is applied only to the OSA product having a sensor chip and a corresponding lens member, and can perform either an emitting alignment or a receiving alignment. On the other hand, for the direction of the optical fiber positioning is perpendicular to the optical alignment plane, the attachment between the optical fiber and the lens member is mainly contributed by the internal elasticity of the optical fiber. Nevertheless, recently, a sensor chip having simply an emitting end and a receiving end and an array chip having 12 emitting terminals and 12 receiving terminals to pair an array lens are found in the marketplace, of which the direction of the optical fiber positioning is parallel to the optical alignment plane. However, in these products, for the lens member and the fiber plug (MT fiber) are both small and thin (about 3~4 mm), the holding in between is usually questionable. Because no relevant jig is available for ensuring firmly the attachment between the fiber plug and lens member during the optical alignment and further by considering the alignment rate for the optical paths, an improvement upon the alignment jig is inevitable.

Referring to FIG. 1A and FIG. 1B, an automatic passive array lens alignment machine is schematically shown. In this machine, a CCD 11 and a respective prism 12 are introduced to perform the optical alignment operation between the lens member 13 and an optical window of a sensor chip 14 on the circuit board 15. As shown in FIG. 1A, while the lens member 13 is optically aligned, the prism 12 is down shifted to allow the CCD 11 to use the upper reflective surface of the prism 12 to capture the image of the lens member 13 in order to perform the alignment. On the other hand, as shown in FIG. 1B, while the optical window of the sensor chip 14 is under the alignment operation, the prism 12 shifted upward so as to allow the CCD 11 to utilize the lower reflective surface to capture the image of the optical window of the sensor chip 14 in order to perform image comparing with the image of the lens member 13. However, the array lens alignment machine as shown in FIG. 1A and FIG. 1B can only perform a normal but not precision alignment due to mechanical displacement tolerance, CCD imaging bias, material difference between the lens member and the sensor chip, and so on. Actually, though the modem automatic passive array lens alignment technology may contribute a satisfied yield of alignment, yet a-μm scale of bias between the lens member and the optical window of the sensor chip is anyway inevitable. In addition, the aforesaid machine is expensive and not a popular technique that can be arbitrarily provided.

SUMMARY OF THE INVENTION

Accordingly, it is the primary object of the present invention to provide an alignment jig for an optical lens array, which is inexpensive and adopts the active optical alignment technology to actively push the fiber plug to tightly engage into the lens socket so as conveniently to perform the active optical alignment operations, such that the product quality can be enhanced by optimizing the optical alignment in each optical pathway.

In the present invention, the alignment jig for an optical lens array is mounted on an optical alignment apparatus. The optical alignment apparatus is to perform the optical alignment operations between a sensor chip on a circuit board and a lens socket having a plugged fiber plug. The alignment jig includes:

a support arm, mounted on the optical alignment apparatus for supporting the alignment jig on the optical alignment apparatus;

a pick-up mechanism, mounted at one end of the support arm for supporting the lens socket in a detachable manner and holding the lens socket at a predetermined position in correspondence with the sensor chip; and a pushing mechanism, for maintaining a plugging status between the fiber plug and the lens socket after the fiber plug being plugged into the lens socket and for providing a pushing force to the fiber plug so as to form a tendency to push and engage the lens socket tightly.

In one embodiment of the present invention, the pick-up mechanism includes:

a vacuum source, for providing a vacuum power;

a main body, having an end to engage the support arm and a central hole to communicate in space with the vacuum source via a connection pipe; and a holder set, engaged with the main body, being communicative in space with the central hole of the main body, having two opposing lateral walls and a rear wall extending downward from respective sides of the holder set; wherein, while the lens socket is located inside the holder set, the two lateral walls and the rear wall contact respectively with two lateral walls and a rear wall of the lens socket so as to have the vacuum power provided by the vacuum source to firmly hold the lens socket inside the holder set; wherein, while the vacuum power of the vacuum source is terminated, the lens socket is separated from the holder set.

In one embodiment of the present invention, the pushing mechanism includes a spring plate, in which the spring plate further has a flat portion, at least one pivot hole located at one end of the flat portion, and at least one clip portion located at another end of the flat portion. The at least one pivot hole is pivotally connected respectively with at least one pivot shaft at the holder set so as to have the spring plate to undergo a pivotal motion around the at least one pivot shaft. The flat portion extends by a predetermined length along a direction approaching the fiber plug from the at least one pivot hole. In the case that the fiber plug is plugged in the lens socket, the clip portion is clamped to contact an end surface of the fiber plug so as to have the clip portion of the spring plate to exert the pushing force onto the fiber plug.

Preferably, in a lateral view, the clip portion of the spring plate is formed as an S-shape structure further having a forcing end for a user to bend the clip portion so as to allow the spring plate to be relieved from a clamp state with the fiber plug.

In one embodiment of the present invention, the pushing mechanism includes:

at least one extendable probe;

a rack block, having at least one through hole for receiving thereinside individually the at least one extendable probe so as to allow the rack block to slide along the extendable probe; and two clamp arms, pivotally mounted to the two lateral sides of the rack block, each of the clamp arms further having a front hook end and a forcing end;

wherein, while the fiber plug is plugged in the lens socket, the individual front hood ends of the two clamp arms are paired to clamp at the respective lateral walls of the holder set, and an end of each of the at least one extendable probe is sent into the pilot hole of the fiber plug so as to pair the two clamp arms for providing the pushing force to the fiber plug.

Preferably, by depressing the forcing ends of the individual clamp arms so as to have the front hook ends to separate the respective lateral walls of the holder set, then the at least one extendable probe can leave the pilot hole of the fiber plug via out-sliding the rack block.

In one embodiment of the present invention, the pushing mechanism includes:

a slider rack mechanism, mounted on the support arm, further having a slider rack and a slider base slippery along the slider rack;

an extension member, installed to either the slider rack or the slider base, further having a contact end; and a magnetic set, having two magnetic members magnetically to each other, wherein one of the two magnetic members is mounted on either the main body or the holder set, while the other one is mounted on the extension member;

wherein, while the fiber plug is plugged in the lens socket, the two magnetic members are magnetically integrated so as to have the contact end of the extension member to contact at an contact surface of the fiber plug, such that the contact end can utilize the magnetic force between the two magnetic members to exert the pushing force onto the fiber plug.

Preferably, one of the two magnetic members is a magnet, while the other magnetic member is a threaded bolt. The extension member further includes a screw hole to receive and lock the threaded bolt. By screwing the threaded bolt in or out of the screw hole, the spacing between the end surface of the threaded bolt and the magnet can be then adjusted so as further to control the magnetic force in between. In the present invention, a small spacing between the magnet and the threaded bolt is necessary to ensure the contact between the fiber plug and the lens socket.

Preferably, the extension member is connected with the vacuum source so as to adopt the vacuum power of the vacuum source to adhere firmly the fiber plug onto a bottom of the extension member. While the vacuum power of the vacuum source is disconnected or terminated, the fiber plug would separate from the extension member.

All these objects are achieved by the alignment jig for an optical lens array described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an alignment jig for an optical lens array. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1B:
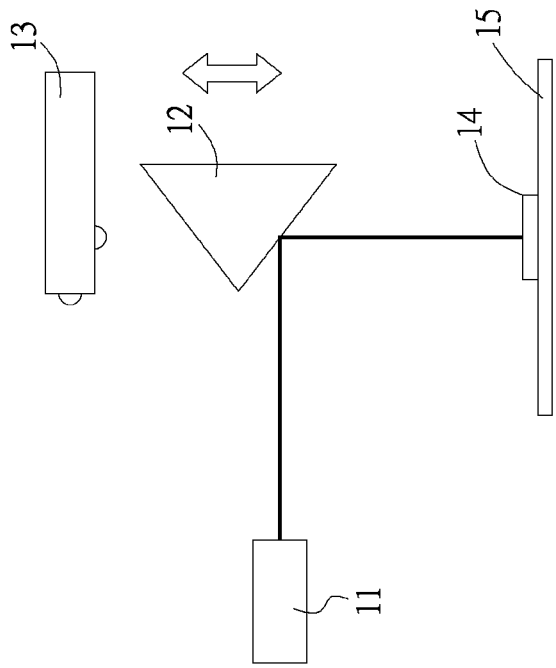
FIG. 1A and FIG. 1B show schematically operations of a conventional automatic passive array lens alignment machine.
Figure 1A:
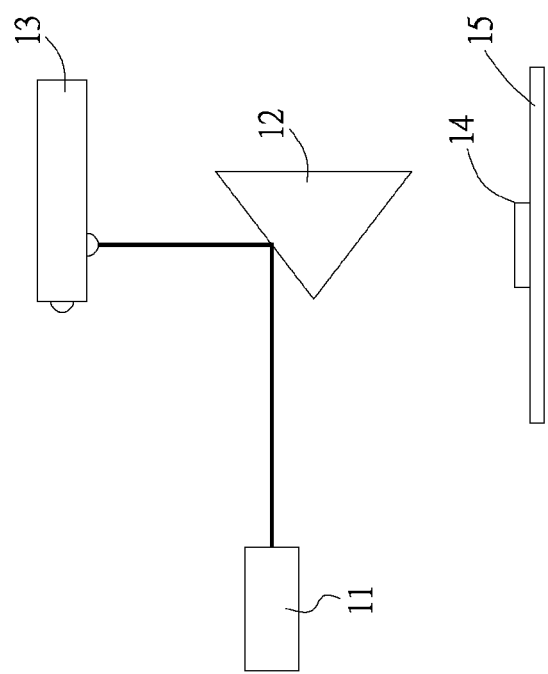
Figure 2A:
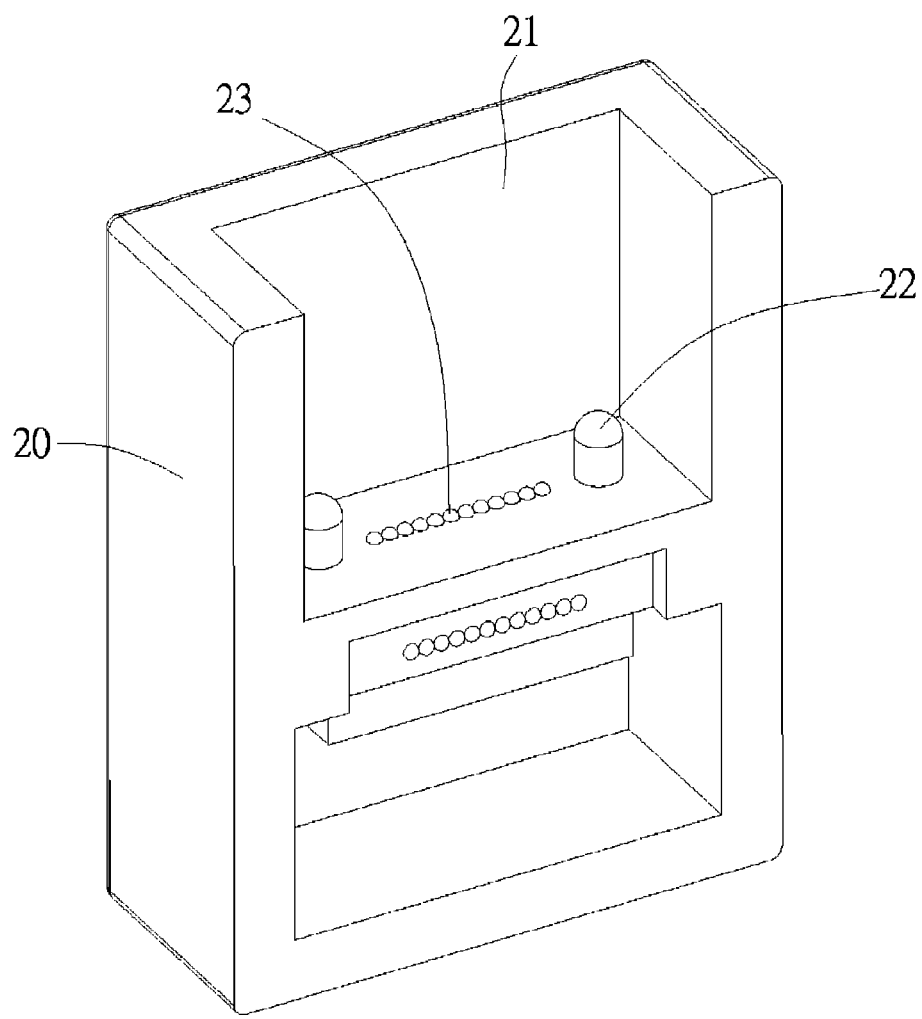
FIG. 2A is a perspective view of a lens socket for a first embodiment of the alignment jig for an optical lens array in accordance with the present invention.
Figure 2B:
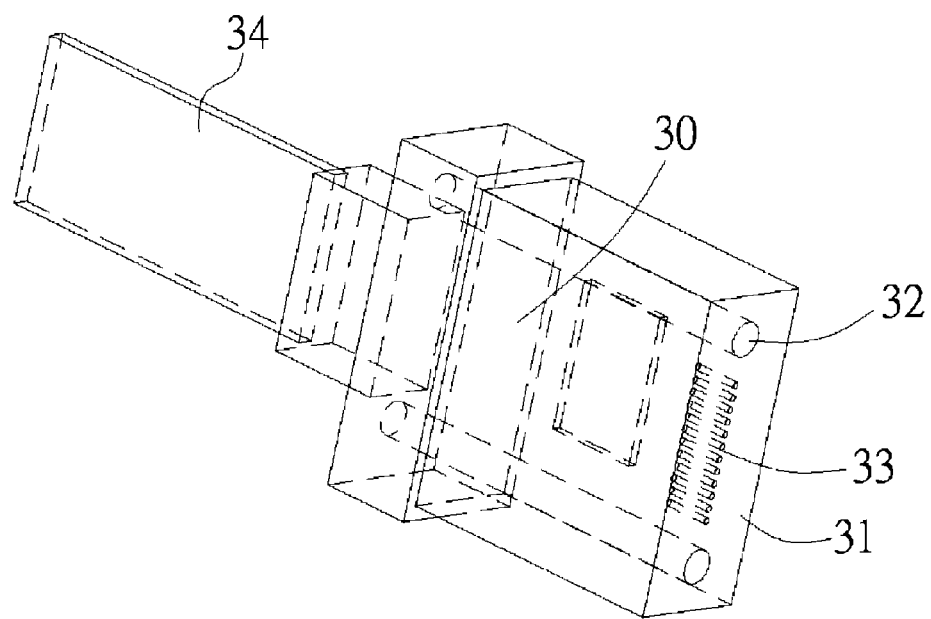
FIG. 2B is a perspective view of a fiber plug for the first embodiment of the alignment jig for an optical lens array in accordance with the present invention.

Referring now to FIG. 2A and FIG. 2B, perspective views of the lens socket 20 and fiber plug 30 applied in the first embodiment of the alignment jig for an optical lens array of the present invention are shown, respectively. In this embodiment, a typical lens socket 20 including a receiving room 21 is to receive a typical plug head 31 of the fiber plug 30, in which a tail end of the fiber plug 30 is connected with an optical fiber cable 34. In the receiving room 21 of the lens socket 20, two position pins 22 and a plurality of light holes 23 are constructed at positions in correspondence with the two pilot holes 32 and a plurality of optical fiber holes 33 at the plug head 31 of the fiber plug 30. While the plug head 31 of the fiber plug 30 is sent into the receiving room 21 of the lens socket 20, the two position pins 22 are pierced into the corresponding pilot holes 32 so as to establish optical pathways by aligning the light holes 23 with the respective optical fiber holes 33. However, if the fiber plug 30 cannot contact tightly with the lens socket 20 or if an oblique engagement is met, spacing would be formed between the light holes 23 and the corresponding optical fiber holes 33. Thus, light loss would be true for such a misalignment, and an optimal optical alignment rate will be far away for the following optical alignment operations. The alignment jig provided by the present invention is to resolve such a misalignment problem. While in performing the optical alignment operations in accordance with the present invention, the fiber plug 30 and the lens socket 20 are contacted tightly so as to avoid any spacing to exist between the light holes 23 and the optical fiber holes 33, and also to prevent from any oblique engagement between the fiber plug 30 and the lens socket 20.

The alignment jig for an optical lens array of the present invention can be constructed on any optical alignment apparatus (not shown herein) already in the marketplace, in which the optical alignment apparatus is to perform optical alignment operations between a sensor chip 14 on a circuit board 15 and a lens socket 20 plugged with a fiber plug 30.

Figure 3A:
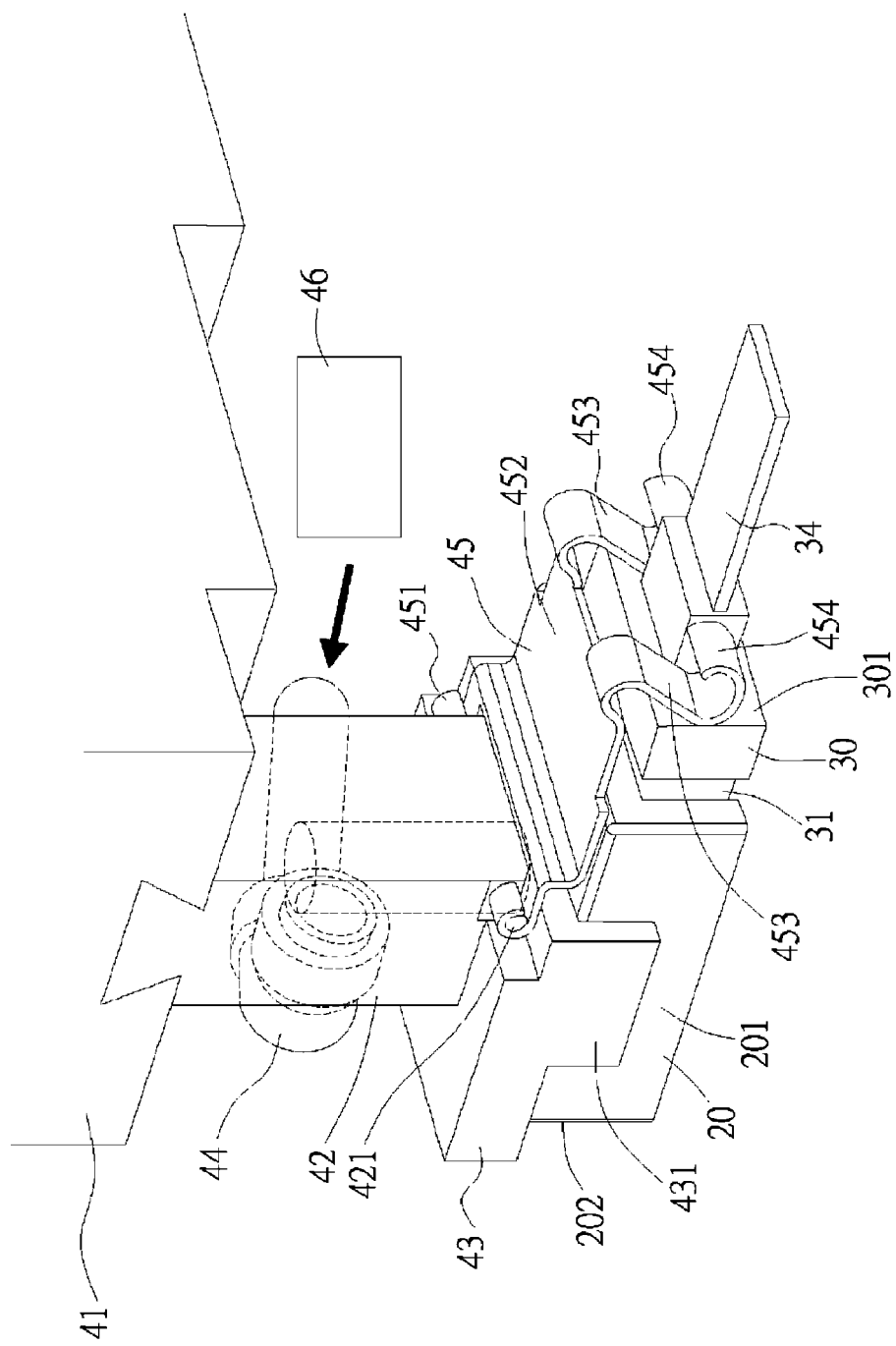
FIG. 3A and FIG. 3B are perspective and side views of the first embodiment of the alignment jig for an optical lens array in accordance with the present invention.
Figure 3B:
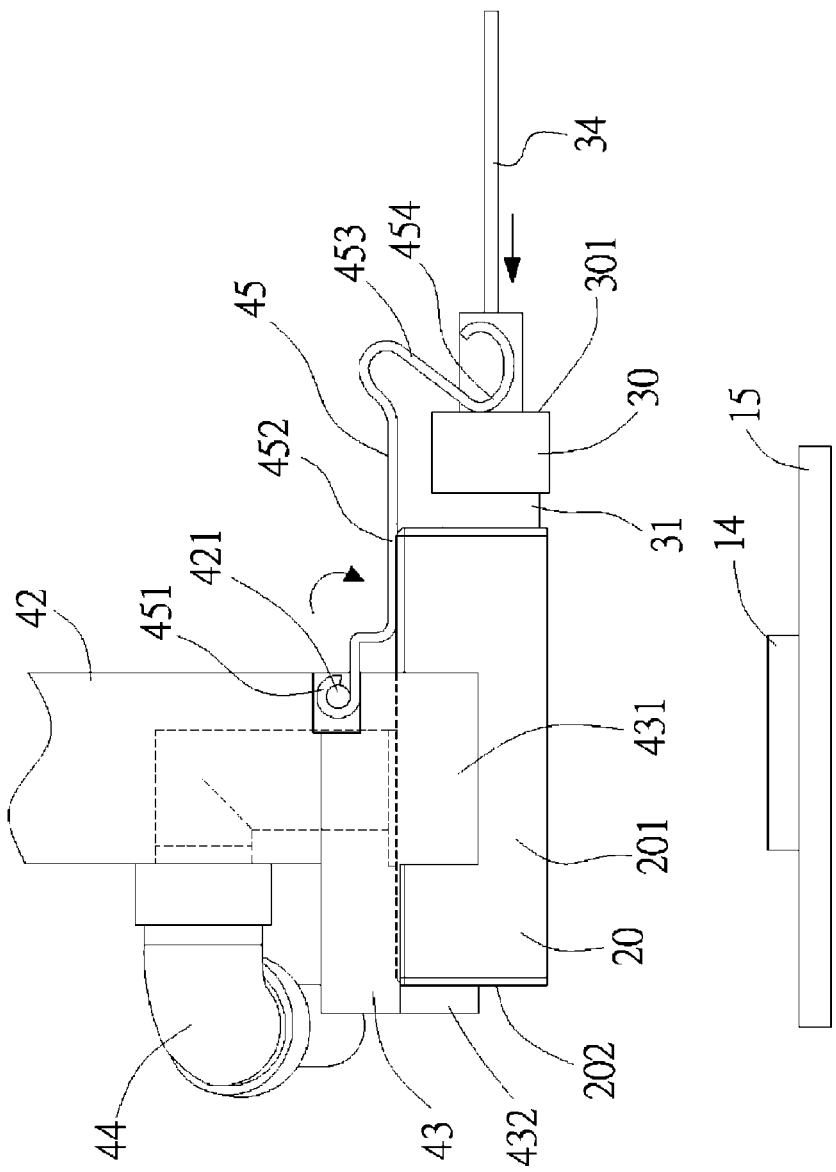

Referring now to FIG. 3A and FIG. 3B, a perspective view and a side view of the first embodiment of the alignment jig for an optical lens array in accordance with the present invention are shown, respectively. In this embodiment, the alignment jig includes a support arm 41, a pick-up mechanism, and a pushing mechanism. The support arm 41, mounted on the optical alignment apparatus, is to support the alignment jig at the optical alignment apparatus. The pick-up mechanism, mounted at one end of the support arm 41, is to pick and hold the lens socket 20 in a detachable and vacuum manner at a predetermined position respective to the sensor chip 14. The pushing mechanism is to maintain the plugging status between the fiber plug 30 and the lens socket 20 after the fiber plug 30 is plugged to engage with the lens socket 20, and further able to provide a pushing force at the fiber plug 30. Upon such an arrangement, the fiber plug 30 can have a tendency of being pushed to engage tightly with the lens socket 20.

In this first embodiment, the pick-up mechanism further includes a vacuum source 46, a main body 42, and a holder set 43. The vacuum source 46 is to provide a vacuum power. One end of the main body 42 is engaged with the support arm 41, and a central hole of the main body 42 is communicative in space with the vacuum source 46 via a connection pipe 44. The holder set 43 engaged with the main body 42 is also communicative in space with the central hole of the main body 42. The holder set 43 has two opposing lateral walls 431 and a rear wall 432 extending downward from respective lateral and rear sides of the holder set 43. While the lens socket 20 is located inside the holder set 43, the two lateral walls 431 and the rear wall 432 would contact respectively with two lateral walls 201 and a rear wall 202 of the lens socket 20 so as to have the vacuum power provided by the vacuum source 46 to firmly hold the lens socket 20 inside the holder set 43. While the vacuum power of the vacuum source 46 is terminated, the lens socket 20 would be separated from the holder set 43.

In this first embodiment, the pushing mechanism includes a spring plate 45, in which the spring plate 45 further has a flat portion 452, at least one pivot hole 451 located at one end of the flat portion 452, and at least one clip portion 453 located at another end of the flat portion 452. The at least one pivot hole 451 is pivotally connected respectively with at least one pivot shaft 421 at either the holder set 43 or the main body 42 so as to have the spring plate 45 to undergo a pivotal motion around the at least one pivot shaft 421. The flat portion 452 extends by a predetermined length along a direction approaching the fiber plug 30 from the at least one pivot hole 451. In the case that the fiber plug 30 is plugged in the lens socket 20, the clip portion 453 is clamped to contact an end surface 301 of the fiber plug 30 so as to have the clip portion 453 of the spring plate 45 to exert the pushing force onto the fiber plug 30. As shown in FIG. 3B, the clip portion 453 of the spring plate 45 is formed as an S-shape structure further having a forcing end 454 for a user to bend the clip portion 453 so as to allow the spring plate 45 to be relieved from a clamp state with the fiber plug 30.

In this first embodiment of the alignment jig in accordance with the present invention, the holder set 43 is mainly to clamp and fix the lens socket 20 in a vacuum manner. The fiber plug 30 inside the lens socket 20 is ensured by the position pins 22 of the lens socket 20. A specific spring plate 45 is mounted to the vacuum holder set 43, and, through the pivot shaft 421, the spring plate 45 can undergo a pivotal motion. By providing the spring force of the spring plate 45, a radial pushing force (along a horizontal direction) can be exerted on the fiber plug 30 so as to push the fiber plug 30 into the lens socket 20 and thus to form a tight engagement in between. Upon such an arrangement, the engagement between the fiber plug 30 and the lens socket 20 can be seamless without an oblique angle that leads to substantial light loss, and the optical alignment rate of the array optical products can be optimal.

In this first embodiment of the alignment jig in accordance with the present invention, the optical alignment operations include the following steps.

Step (a1): Start a vacuum pump of the vacuum source 46 to form a vacuum state through the connection pipe 44, the central hole of the main body 42, and the holder set 43.

Step (a2): Have the holder set 43 to suck the plastic lens socket 20 by pairing and contacting tightly the two lateral walls 201 and the rear wall 202 of the lens socket 20 to the two lateral walls 431 and the rear wall 432 of the holder set 43, respectively, so as to ensure coherence and repeatability of the operations.

Step (a3): Plug the fiber plug 30 horizontally into the lens socket 20. Be sure that the lens socket 20 keeps the position during the plugging and the holder set 43 is firmly sucked by the vacuum.

Step (a4): Bend down the spring plate 45 of the pushing mechanism. Be sure that the clip portion 453 of the spring plate 45 is contacted at the end surface 301 of the fiber plug 30, as shown in FIG. 3B, and the position of the lens socket 20 does not shifted during this process.

Step (a5): Apply the optical alignment apparatus to perform the optical alignment operations between the sensor chip 14 on the circuit board 15 and the lens socket 20 plugged with the fiber plug 30.

Step (a6): Perform the dispensing and setting process after the optical alignment operations. As soon as the dispensing and setting process is finished, bend back the spring plate 45, unplug the fiber plug 30, and terminate the vacuum state.

Figure 4A:
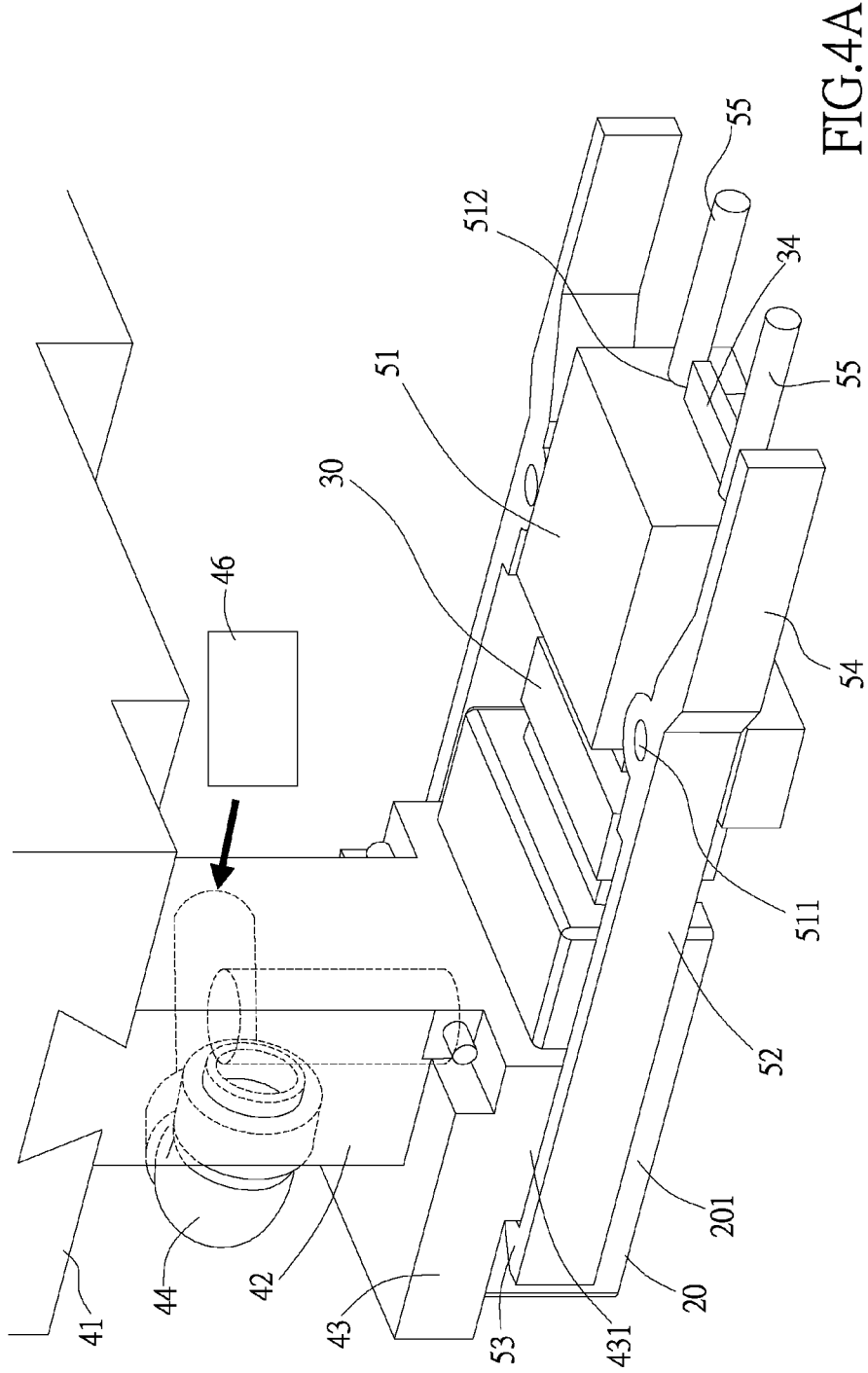
FIG. 4A and FIG. 4B are perspective and top views of a second embodiment of the alignment jig for an optical lens array in accordance with the present invention.
Figure 4B:
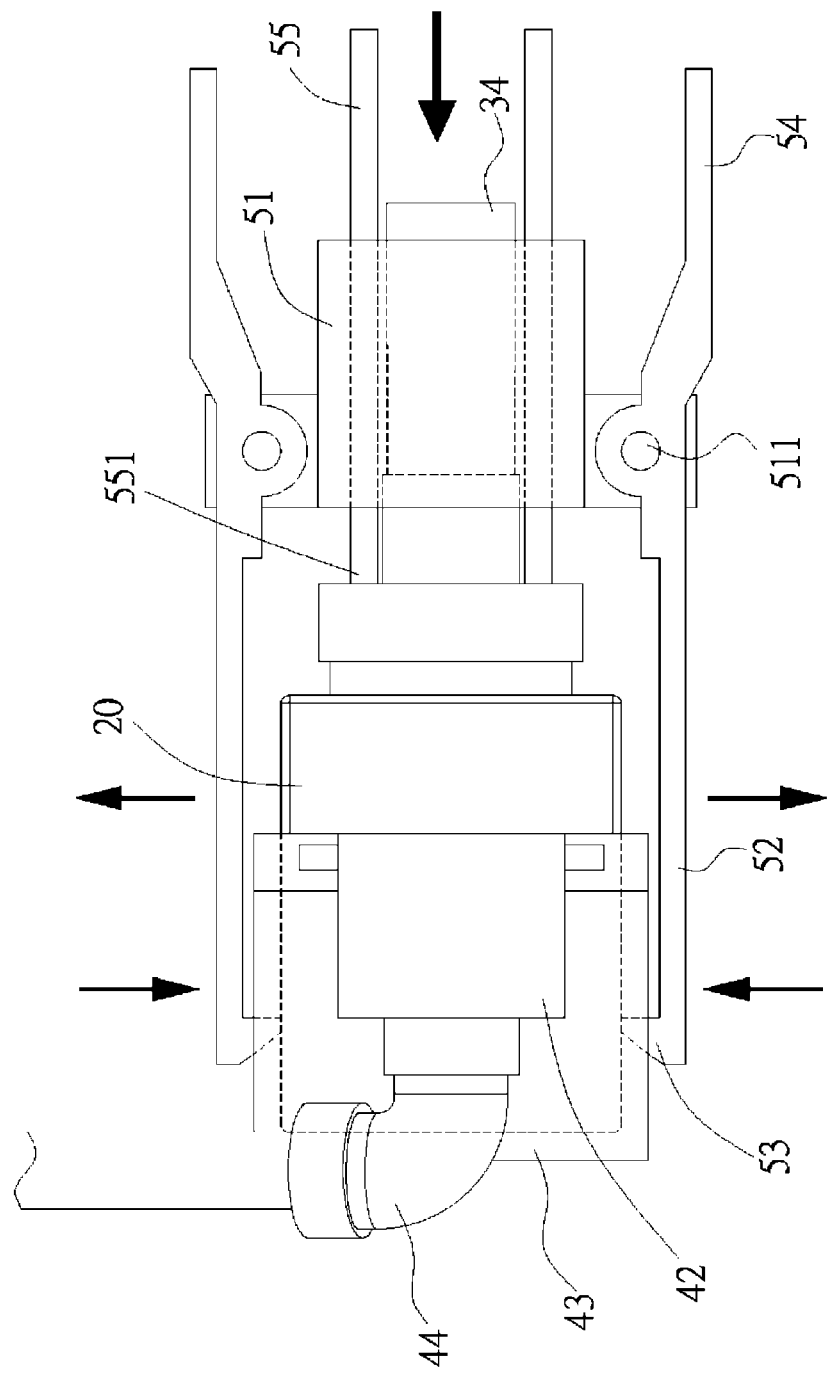

Referring now to FIG. 4A and FIG. 4B, a perspective view and a top view of a second embodiment of the alignment jig for an optical lens array in accordance with the present invention are shown, respectively. In this embodiment, similar to the foregoing first embodiment, the alignment jig includes a support arm 41, a pick-up mechanism, and a pushing mechanism. The support arm 41, mounted on the optical alignment apparatus, is to support the alignment jig at the optical alignment apparatus. The pick-up mechanism, mounted at one end of the support arm 41, is to pick and hold the lens socket 20 in a detachable and vacuum manner at a predetermined position respective to the sensor chip 14. The pushing mechanism is to maintain the plugging status between the fiber plug 30 and the lens socket 20 after the fiber plug 30 is plugged to engage with the lens socket 20, and further able to provide a pushing force at the fiber plug 30. Upon such an arrangement, the fiber plug 30 can have a tendency of being pushed to engage tightly with the lens socket 20.

In this second embodiment, the pick-up mechanism includes a vacuum source 46, a main body 42, and a holder set 43. The vacuum source 46 is to provide a vacuum power. One end of the main body 42 is engaged with the support arm 41, and a central hole of the main body 42 is communicative in space with the vacuum source 46 via a connection pipe 44.

The holder set 43 engaged with the main body 42 is also communicative in space with the central hole of the main body 42. The holder set 43 has two opposing lateral walls 431 and a rear wall 432 extending downward from respective lateral and rear sides of the holder set 43. While the lens socket 20 is located inside the holder set 43, the two lateral walls 431 and the rear wall 432 would contact respectively with two lateral walls 201 and a rear wall 202 of the lens socket 20 so as to have the vacuum power provided by the vacuum source 46 to firmly hold the lens socket 20 inside the holder set 43. While the vacuum power of the vacuum source 46 is terminated, the lens socket 20 would be separated from the holder set 43.

In this second embodiment, the pushing mechanism includes at least one elastic extendable probe 55, a rack block 51, and two clamp arm 52. The rack block 51 has at least one through hole 512 for receiving thereinside individually the at least one extendable probe 55 so as to allow the rack block 51 to slide along the extendable probe 55. The two clamp arms 52 are pivotally mounted to the two lateral sides of the rack block 51, and each of the clamp arms 52 further has a front hook end 53 and a forcing end 54. While the fiber plug 30 is plugged in the lens socket 20, the individual front hood ends 53 of the two clamp arms 52 are paired to clamp at the respective lateral walls 431 of the holder set 43, and an end 551 of each of the at least one extendable probe 55 is sent into the pilot hole 32 of the fiber plug 30 so as to pair the two clamp arms 52 for providing the pushing force to the fiber plug 30. By depressing the forcing ends 54 of the individual clamp arms 52 so as to have the front hook ends 53 to separate the respective lateral walls 431 of the holder set 43 and simultaneously to release the elastic potential of the at least one extendable probe 55 as a pushing force, then the at least one extendable probe 55 can leave the pilot hole 32 of the fiber plug 30 via out-sliding the rack block 51.

In this second embodiment, the distance between the front hook end 53 and the middle pivotal end 511 of the clamp arm 52 is slightly smaller than the space between the fiber plug 30 and the lens socket 20; such that, after the front hook end 53 of the clamp arm 52 buckles up the vacuum holder set 43, the extendable probe 55 can still maintain a substantial pushing force to have the fiber plug 30 to contact tightly the lens socket 20. Namely, as the extendable probe 55 is yet to be depressed for storing elastic potential of the later pushing force, the front hook end 53 of the clamp arm 52 is unable to buckle the vacuum holder set 43.

In this second embodiment of the alignment jig in accordance with the present invention, the holder set 43 is mainly to clamp and fix the lens socket 20 in a vacuum manner. The fiber plug 30 inside the lens socket 20 is ensured by the position pins 22 of the lens socket 20. The rack block 51 able to slide transversely along the extendable probe 55 includes two through holes 512 for receiving the two extendable probes 55. One end of each the extendable probe 55 is sent to the respective through pilot hole 32 of the fiber plug 30. In addition, the specific clamp arm structure 52 is mounted to the rack block 51 so as, while the rack block 51 slides transversely, to drive synchronously the fiber plug 30 to further align directly the corresponding position pin 22 inside the lens socket 20. Further, by providing the elastic pushing force of the extendable probe 55 to push the fiber plug 30 to contact tightly the lens socket 20, and then by applying the clamp arms 52 to fix the fiber plug 30 and the lens socket 20 seamlessly and free of oblique angling in between, possible light loss can be avoided and the optical alignment rate for the array optical products can be optimal.

In this second embodiment of the alignment jig in accordance with the present invention, the optical alignment operations include the following steps.

Step (b1): Start a vacuum pump of the vacuum source 46 to form a vacuum state through the connection pipe 44, the central hole of the main body 42, and the holder set 43.

Step (b2): Have the holder set 43 to suck the plastic lens socket 20 by pairing and contacting tightly the two lateral walls 201 and the rear wall 202 of the lens socket 20 to the two lateral walls 431 and the rear wall 432 of the holder set 43, respectively, so as to ensure coherence and repeatability of the operations.

Step (b3): Mount the clamp arms 52 to the two lateral sides of the rack block 51.

Step (b4): Have the head end of the extendable probe 55a to plug into the rack block 51, while another end of the extendable probe 55a is sent into the pilot hole 32 of the fiber plug 30, so that the fiber plug 30 can move together with the rack block 51.

Step (b5): Push the rack block 51 to horizontally plug the fiber plug 30 into the lens socket 20, and ensure that, during the plugging of the fiber plug 30, the lens socket 20 holds the position and is firmly sucked by the vacuum holder set 43.

Step (b6): Buckle up the two clamp arms 52, and ensure that, during the buckling, the front hook ends 53 of the two clamp arms 52 hook at the respective lateral walls 431 of the vacuum holder set 43 as shown in FIG. 4B and the lens socket 20 holds the position.

Step (b7): Apply the optical alignment apparatus to perform the optical alignment operations between the sensor chip 14 on the circuit board 15 and the lens socket 20 plugged with the fiber plug 30.

Step (b8): Perform the dispensing and setting process after the optical alignment operations. As soon as the dispensing and setting process is finished, relieve the clamp arms 52, unplug the fiber plug 30, and terminate the vacuum state.

Figure 5A:
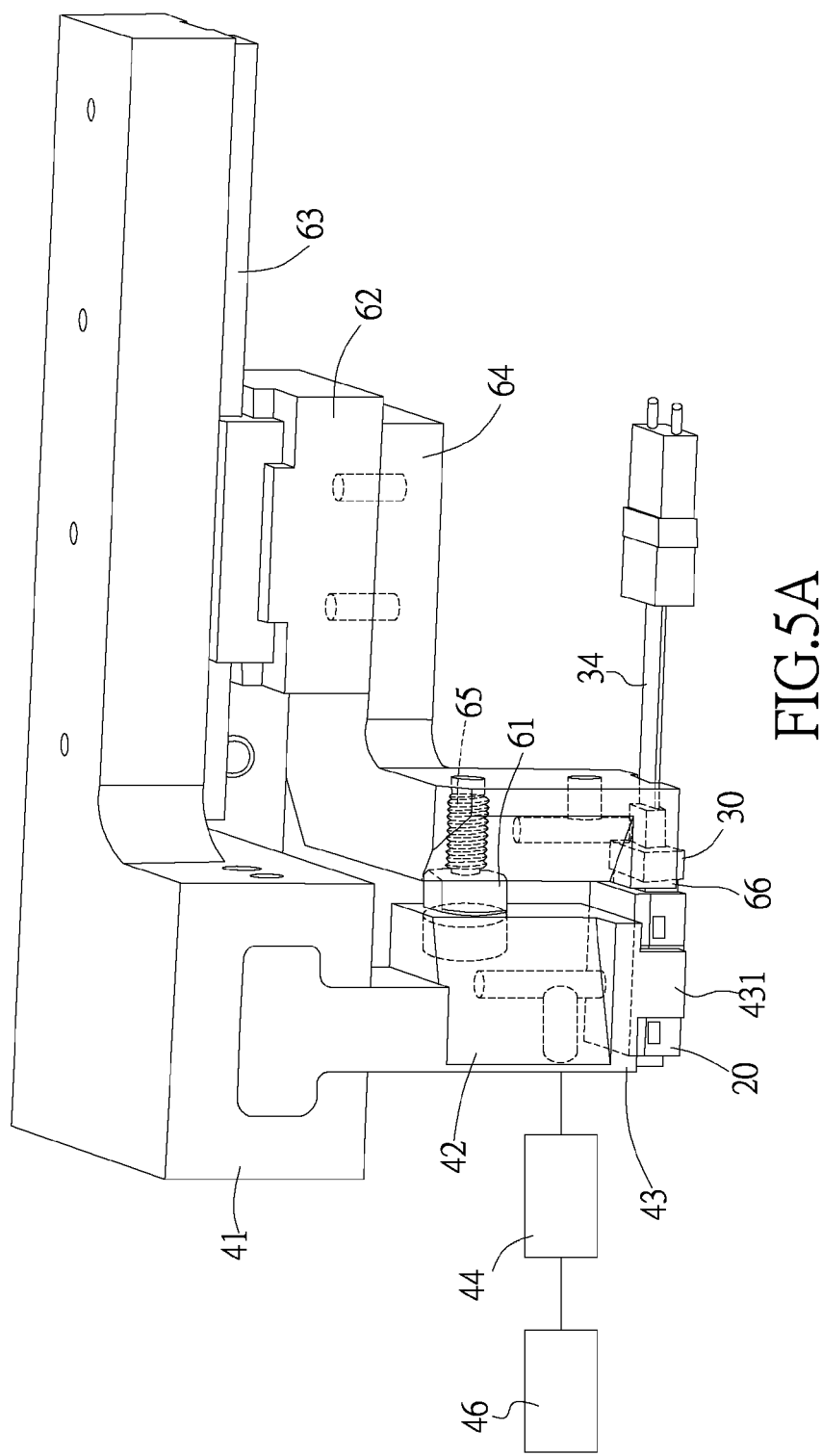
FIG. 5A and FIG. 5B are perspective and side views of a third embodiment of the alignment jig for an optical lens array in accordance with the present invention.
Figure 5B:
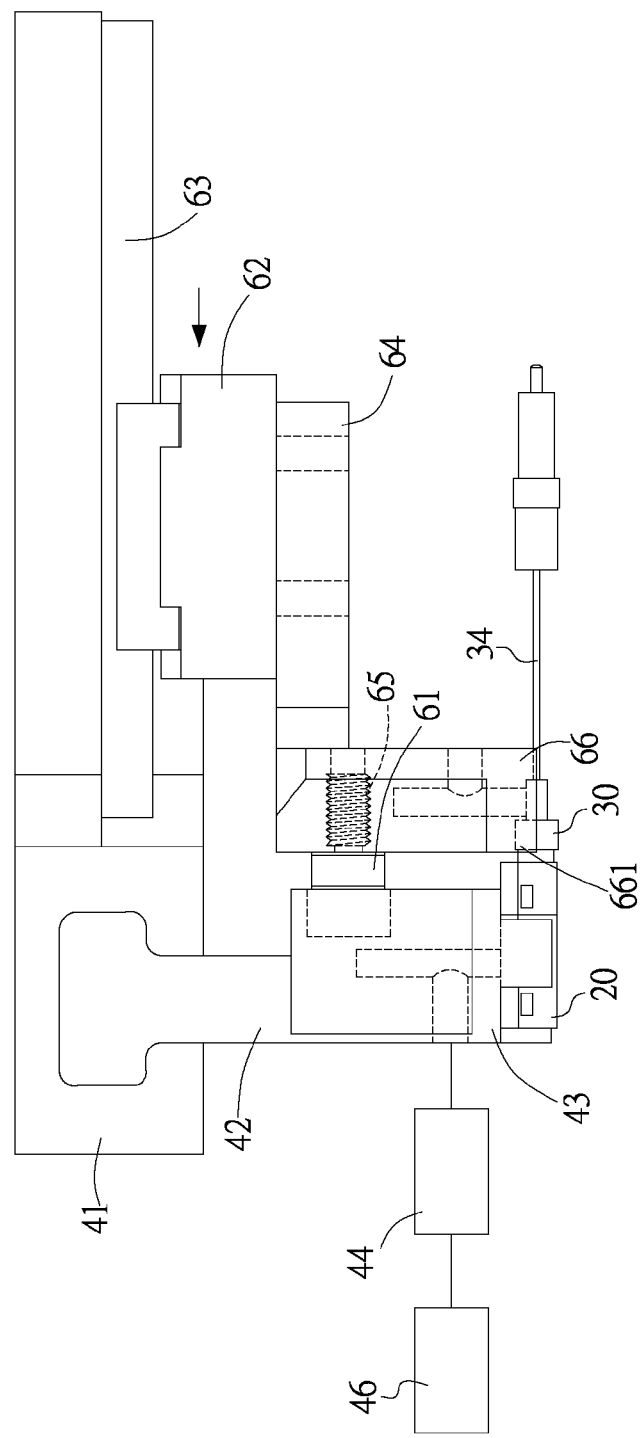

Referring now to FIG. 5A and FIG. 5B, a perspective view and a side view of a third embodiment of the alignment jig for an optical lens array in accordance with the present invention are shown, respectively. In this embodiment, similar to the foregoing first embodiment, the alignment jig includes a support arm 41, a pick-up mechanism, and a pushing mechanism. The support arm 41, mounted on the optical alignment apparatus, is to support the alignment jig at the optical alignment apparatus. The pick-up mechanism, mounted at one end of the support arm 41, is to pick and hold the lens socket 20 in a detachable and vacuum manner at a predetermined position respective to the sensor chip 14. The pushing mechanism is to maintain the plugging status between the fiber plug 30 and the lens socket 20 after the fiber plug 30 is plugged to engage with the lens socket 20, and further able to provide a pushing force at the fiber plug 30. Upon such an arrangement, the fiber plug 30 can have a tendency of being pushed to engage tightly with the lens socket 20.

In this third embodiment, the pick-up mechanism includes a vacuum source 46, a main body 42, and a holder set 43. The vacuum source 46 is to provide a vacuum power. One end of the main body 42 is engaged with the support arm 41, and a central hole of the main body 42 is communicative in space with the vacuum source 46 via a connection pipe 44. The holder set 43 engaged with the main body 42 is also communicative in space with the central hole of the main body 42. The holder set 43 has two opposing lateral walls 431 and a rear wall 432 extending downward from respective lateral and rear sides of the holder set 43. While the lens socket 20 is located inside the holder set 43, the two lateral walls 431 and the rear wall 432 would contact respectively with two lateral walls 201 and a rear wall 202 of the lens socket 20 so as to have the vacuum power provided by the vacuum source 46 to firmly hold the lens socket 20 inside the holder set 43. While the vacuum power of the vacuum source 46 is terminated, the lens socket 20 would be separated from the holder set 43.

In this third embodiment, the pushing mechanism includes a slider rack mechanism, an extension member 64, and a magnetic set. The slider rack mechanism, mounted on the support arm 41, further has a slider rack 63 and a slider base 62 slippery along the slider rack 63. The extension member 64, installed to either the slider rack 63 or the slider base 62, further has a contact end 66. The magnetic set has two magnetic members 61, 65 magnetically to each other, in which one magnetic member 61 is mounted on either the main body 42 or the holder set 43, while the other one 65 is mounted on the extension member 64. While the fiber plug 30 is plugged in the lens socket 20, the two magnetic members 61, 65 are magnetically integrated with a tiny spacing in between so as to have the contact end 66 of the extension member 64 to contact at the end surface 301 of the fiber plug 30, such that the contact end 66 can utilize the magnetic force between the two magnetic members 61, 65 to exert the pushing force onto the fiber plug 30. In this embodiment, one magnetic member 61 is a magnet, while the other magnetic member 65 is a magnetic element such as the threaded bolt or another magnet.

As shown in FIG. 5A and FIG. 5B, in this third embodiment, the magnetic member 65 is embodied as a magnetic threaded bolt, and the extension member 64 member further includes a screw hole to receive and lock the threaded bolt 65. By screwing the threaded bolt 65 in or out of the screw hole, the spacing between the end surface of the threaded bolt 65 and the magnet 61 can be then adjusted so as further to control the magnetic force in between. In the present invention, a small spacing between the magnet 61 and the threaded bolt 65 is necessary to ensure the contact between the fiber plug 30 and the lens socket 20.

In this third embodiment, the extension member 64 is further connected with the vacuum source 46 so as to adopt the vacuum power of the vacuum source 46 to adhere firmly the fiber plug 30 onto a bottom of the extension member 64. While the vacuum power of the vacuum source 46 is disconnected or terminated, the fiber plug 30 would separate from the extension member 64.

In this third embodiment of the alignment jig in accordance with the present invention, the lens socket 20 is fixedly clamped mainly by the vacuum holder set 43. The fiber plug 30 is precisely plugged into the lens socket 20 by engaging the position pins 22 inside the lens socket 20. In this embodiment, the slider rack mechanism can displace transversely. Another vacuum holder set located under the extension member 64 is constructed on the slider base 62 of the slider rack mechanism for positioning the fiber plug 30. Between the two vacuum holder set, an enforced magnet 61 and a magnetic threaded bolt 65 are mounted. While the vacuum holder set sucking the fiber plug 30 moves to approach the les socket 20 above the slider base 62, the position pins 22 inside the lens socket 20 can provide directly the alignment and the positioning. At this time, the magnetic effect between the magnet 61 and the magnetic threaded bolt 65 would drive the fiber plug 30 to contact tightly with the lens socket 20. Upon such an arrangement, the engagement between the fiber plug 30 and the lens socket 20 can be seamless without an oblique angle that leads to substantial light loss, and the optical alignment rate of the array optical products can be optimal.

In this first embodiment of the alignment jig in accordance with the present invention, the optical alignment operations include the following steps.

Step (c1): Start a vacuum pump of the vacuum source 46 to form a vacuum state through the connection pipe 44, the central hole of the main body 42, and the holder set 43.

Step (c2): Have the holder set 43 to suck the plastic lens socket 20 by pairing and contacting tightly the two lateral walls 201 and the rear wall 202 of the lens socket 20 to the two lateral walls 431 and the rear wall 432 of the holder set 43, respectively, so as to ensure coherence and repeatability of the operations.

Step (c3): Have the vacuum holder set on the slider rack mechanism to suck the fiber plug 30 so as to have the fiber plug 30 to move with the slider base 62;

Step (c4): Push the slider base 62 to horizontally plug the fiber plug 30 into the lens socket 20, and ensure that, during the plugging of the fiber plug 30, the lens socket 20 holds the position and is firmly sucked by the vacuum holder set.

Step (c5): While the two vacuum holder sets are approaching, the threaded bolt 65 would be pulled by the enforced magnet 61 as shown in FIG. 5B, so that the fiber plug 30 and the lens socket 20 can contact tightly and the lens socket 20 can hold the position during the operations.

Step (c6): Apply the optical alignment apparatus to perform the optical alignment operations between the sensor chip 14 on the circuit board 15 and the lens socket 20 plugged with the fiber plug 30.

Step (c7): Perform the dispensing and setting process after the optical alignment operations. As soon as the dispensing and setting process is finished, bend back the spring plate 45, unplug the fiber plug 30, and terminate the vacuum state.

In all the aforesaid three embodiments of the present invention, the vacuum suckers are introduced to fix the lens socket by exerting a horizontal pushing force onto the fiber plug, such that the engagement between the fiber plug 30 and the lens socket 20 can be seamless without an oblique angle that leads to substantial light loss, and the optical alignment rate of the array optical products can be optimal. Also, the initial alignment position after each changes of the lens socket can be fixed, the optical alignment quality can be increased, and the production yield and production efficiency can be enhanced.

While the present invention has been particularly shown and described with reference to a preferred embodiment, it will be understood by those skilled in the art that various changes in form and detail may be without departing from the spirit and scope of the present invention.

What is claimed is:

1. An alignment jig for an optical lens array, mounted on an optical alignment apparatus, the optical alignment apparatus being to perform optical alignment operations between a sensor chip on a circuit board and a lens socket having a plugged fiber plug, comprising:
   a support arm, mounted on the optical alignment apparatus for supporting the alignment jig on the optical alignment apparatus;
   a pick-up mechanism, mounted at one end of the support arm for supporting the lens socket in a detachable manner and holding the lens socket at a predetermined position in correspondence with the sensor chip; and
   a pushing mechanism, for maintaining a plugging status between the fiber plug and the lens socket after the fiber plug being plugged into the lens socket and for providing a pushing force to the fiber plug so as to form a tendency to push and engage the lens socket tightly.

2. The alignment jig for an optical lens array according to claim 1, wherein the pick-up mechanism further includes:
- a vacuum source, for providing a vacuum power;
- a main body, having an end to engage the support arm and a central hole to communicate in space with the vacuum source via a connection pipe; and
- a holder set, engaged with the main body, being communicative in space with the central hole of the main body, having two opposing lateral walls and a rear wall extending downward from respective sides of the holder set; wherein, while the lens socket is located inside the holder set, the two lateral walls and the rear wall contact respectively with two lateral walls and a rear wall of the lens socket so as to have the vacuum power provided by the vacuum source to firmly hold the lens socket inside the holder set; wherein, while the vacuum power of the vacuum source is terminated, the lens socket is separated from the holder set.

3. The alignment jig for an optical lens array according to claim 2, wherein the pushing mechanism further includes a spring plate, the spring plate further having a flat portion, at least one pivot hole located at one end of the flat portion, and at least one clip portion located at another end of the flat portion, the at least one pivot hole being pivotally connected respectively with at least one pivot shaft at the holder set so as to have the spring plate to undergo a pivotal motion around the at least one pivot shaft, the flat portion extending by a predetermined length along a direction approaching the fiber plug from the at least one pivot hole, wherein, while the fiber plug is plugged in the lens socket, the clip portion is clamped to contact an end surface of the fiber plug so as to have the clip portion of the spring plate to exert the pushing force onto the fiber plug.

4. The alignment jig for an optical lens array according to claim 3, wherein the clip portion of the spring plate is formed as an S-shape structure further having a forcing end for a user to bend the clip portion so as to allow the spring plate to be relieved from a clamp state with the fiber plug.

5. The alignment jig for an optical lens array according to claim 2, wherein the pushing mechanism further includes:
- at least one extendable probe;
- a rack block, having at least one through hole for receiving thereinside individually the at least one extendable probe so as to allow the rack block to slide along the extendable probe; and
- two clamp arms, pivotally mounted to the two lateral sides of the rack block, each of the clamp arms further having a front hook end and a forcing end;
- wherein, while the fiber plug is plugged in the lens socket, the individual front hood ends of the two clamp arms are paired to clamp at the respective lateral walls of the holder set, and an end of each of the at least one extendable probe is sent into the pilot hole of the fiber plug so as to pair the two clamp arms for providing the pushing force to the fiber plug.

6. The alignment jig for an optical lens array according to claim 5, wherein, by depressing the forcing ends of the individual clamp arms as to have the front hook ends to separate the respective lateral walls of the holder set, the at least one extendable probe leaves the pilot hole of the fiber plug.

7. The alignment jig for an optical lens array according to claim 2, wherein the pushing mechanism further includes:
- a slider rack mechanism, mounted on the support arm, further having a slider rack and a slider base slippery along the slider rack;
- an extension member, installed to one of the slider rack and the slider base, further having a contact end; and
- a magnetic set, having two magnetic members magnetically to each other, wherein one of the two magnetic members is mounted on one of the main body and the holder set, while the other one of the two magnetic members is mounted on the extension member;
- wherein, while the fiber plug is plugged in the lens socket, the two magnetic members are magnetically integrated so as to have the contact end of the extension member to contact at an contact surface of the fiber plug, such that the contact end can utilize the magnetic force between the two magnetic members to exert the pushing force onto the fiber plug.

8. The alignment jig for an optical lens array according to claim 7, wherein one of the two magnetic members is a magnet, while the other magnetic member is a threaded bolt, the extension member further including a screw hole to receive and lock the threaded bolt; wherein, by screwing the threaded bolt in or out of the screw hole, spacing between the end surface of the threaded bolt and the magnet is adjusted so as to control the magnetic force in between; wherein a small spacing between the magnet and the threaded bolt is necessary to ensure the contact between the fiber plug and the lens socket.

9. The alignment jig for an optical lens array according to claim 7, wherein the extension member is connected with the vacuum source so as to adopt the vacuum power of the vacuum source to adhere firmly the fiber plug onto a bottom of the extension member, wherein, while the vacuum power of the vacuum source is terminated, the fiber plug is separate from the extension member.

* * * * *